(12) United States Patent
Oury, Jr. et al.

(10) Patent No.: US 10,690,234 B1
(45) Date of Patent: Jun. 23, 2020

(54) ELECTRIC VEHICLE POWERTRAIN

(71) Applicant: Proterra Inc., Burlingame, CA (US)

(72) Inventors: Robert F. Oury, Jr., Simpsonville, SC (US); Matthew D. Simonini, Greenville, SC (US)

(73) Assignee: Proterra Inc., Burlingame, CA (US)

( * ) Notice: Subject to any disclaimer, the term of this patent is extended or adjusted under 35 U.S.C. 154(b) by 0 days.

(21) Appl. No.: 16/353,244

(22) Filed: Mar. 14, 2019

(51) Int. Cl.
| | |
|---|---|
| F16H 57/04 | (2010.01) |
| B60K 11/02 | (2006.01) |
| B60K 1/02 | (2006.01) |
| H02K 7/00 | (2006.01) |
| H02K 7/116 | (2006.01) |
| H02K 9/19 | (2006.01) |
| B60K 1/00 | (2006.01) |

(52) U.S. Cl.
CPC .......... *F16H 57/0476* (2013.01); *B60K 1/02* (2013.01); *B60K 11/02* (2013.01); *F16H 57/0402* (2013.01); *F16H 57/0413* (2013.01); *F16H 57/0417* (2013.01); *H02K 7/006* (2013.01); *H02K 7/116* (2013.01); *H02K 9/19* (2013.01); *B60K 2001/006* (2013.01); *B60Y 2200/91* (2013.01); *B60Y 2200/92* (2013.01)

(58) Field of Classification Search
CPC ............. F16H 57/0476; F16H 57/0402; F16H 57/0413; F16H 57/0412; F16H 57/0415; F16H 57/0417; B60K 1/02; B60K 11/02; B60K 2001/006; B60Y 2200/91; B60Y 2200/92; H02K 7/006; H02K 7/116; H02K 9/19
USPC ........................................................ 180/65.6
See application file for complete search history.

(56) References Cited

U.S. PATENT DOCUMENTS

| | | | | |
|---|---|---|---|---|
| 5,316,106 | A * | 5/1994 | Baedke ................. | B60K 17/16 184/104.3 |
| 8,453,773 | B2 | 6/2013 | Hill et al. | |
| 8,783,393 | B2 * | 7/2014 | Besler .................... | B60B 35/16 180/60 |
| 9,266,423 | B2 * | 2/2016 | Hoshinoya ............ | B60K 20/00 |
| 9,853,523 | B2 * | 12/2017 | Caron ................... | H02K 9/193 |
| 2014/0070767 | A1 | 3/2014 | Morris et al. | |
| 2017/0097086 | A1 * | 4/2017 | Ono .................... | F16H 57/0412 |
| 2018/0037128 | A1 | 2/2018 | Gerber et al. | |

* cited by examiner

*Primary Examiner* — John D Walters
(74) *Attorney, Agent, or Firm* — Bookhoff McAndrews, PLLC (57) ABSTRACT

An electric vehicle may include a powertrain including an axle having a first drive wheel and a second drive wheel, a first motor and a first gearbox operatively coupled to the first drive wheel, and a second motor and a second gearbox operatively coupled to the second drive wheel. The electric vehicle may also include a radiator including coolant, and an oil manifold including first and second oil inlets, first and second oil outlets, first and second coolant inlets, and at least one coolant outlet. The oil manifold may be fluidly connected to the first and second gearboxes, the first and second motors, and to the radiator.

20 Claims, 7 Drawing Sheets

ELECTRIC VEHICLE POWERTRAIN

TECHNICAL FIELD

Embodiments of this disclosure relate to vehicle powertrains, such as, for example, an electric vehicle powertrain.

BACKGROUND

The powertrain of a vehicle refers to a group of components that generate and deliver power to the road surface to propel the vehicle along the road. In general, the powertrain includes a power source that generates or provides power, and a transmission that transmits the power to the drive wheels of the vehicle. In an electric vehicle, or a hybrid vehicle operating in the electric mode, one or more electric motors serve as the power source. In such vehicles, a battery provides power to drive the motors to produce torque. An inverter coupled to the motors directs current to the motors to produce torque in response to a torque request by a driver of the vehicle. The driver controls the position of the accelerator and brake pedals to request different amounts of torque from the motors. When the driver presses down on (or depresses) the accelerator pedal, a controller detects the position of the pedal and sends a signal to the motors to increase the torque produced. When the driver releases the accelerator pedal and/or presses down on the brake pedal, the controller sends a signal to the motors to decrease the torque produced.

The transmission transmits the rotational power produced by the motors to the drive wheels of the vehicle. The transmission includes components that convert the speed and torque produced by the motor to that desired by the vehicle. One form of a transmission includes one or more gearboxes that use gears to provide speed and torque conversions between the motors and the drive wheels. Typically, an input shaft inputs power from a motor to a gearbox and an output shaft outputs the power from the gearbox to a drive wheel. The gearboxes include gears that selectively engage or disengage to increase or decrease the speed/torque between the input and output shafts. Typically, a control unit of the powertrain initiates a gear shift in the transmission in response to driving conditions.

When the transmission includes more than one gearbox, each gearbox requires oil for cooling and lubrication. Delivering cool and clean oil to each gearbox often requires bulky or sizeable components to be positioned in a small space within the axle, and may result in unequal delivery of oil to the gearboxes. Additionally, the components to deliver the cool and clean oil often necessitates a plurality of fittings between the component, and the fittings may be expensive and/or prone to leak, break, or otherwise malfunction. Such a system may affect the performance and durability of the vehicle. Embodiments of the current disclosure may address these limitations and/or other problems in the art. The scope of the current disclosure, however, is defined by the attached claims, and not by the ability to solve any specific problem.

SUMMARY

Embodiments of the present disclosure relate to, among other things, powertrains for an electric vehicle. Each of the embodiments disclosed herein may include one or more of the features described in connection with any of the other disclosed embodiments.

In one embodiment, an electric vehicle may include a powertrain including an axle having a first drive wheel and a second drive wheel, a first motor and a first gearbox operatively coupled to the first drive wheel, and a second motor and a second gearbox operatively coupled to the second drive wheel. The electric vehicle may also include a radiator including coolant, and an oil manifold including first and second oil inlets, first and second oil outlets, first and second coolant inlets, and at least one coolant outlet. The oil manifold may be fluidly connected to the first and second gearboxes, the first and second motors, and to the radiator.

In another embodiment, an oil manifold for an electric vehicle may include first and second oil inlets, first and second oil outlets, first and second coolant inlets, at least one coolant outlet, and first and second oil pumps. The first and second oil inlets, first and second oil outlets, and first and second oil pumps may form two fluidly isolated oil flow paths within the oil manifold.

In yet another embodiment, a powertrain for an electric vehicle may include a first electric motor coupled to a first drive wheel via a first gearbox, a second motor independently coupled to a second drive wheel via a second gearbox, and an oil manifold. The oil manifold may include a manifold body, first and second oil inlets on the manifold body, first and second oil outlets on the manifold body, first and second coolant inlets on the manifold body, and at least one coolant outlet on the manifold body. The manifold body may include a plurality of passageways fluidly connecting the first oil inlet to the first oil outlet, the second oil inlet to the second oil outlet, and the first and second coolant inlets to the at least one coolant outlet. The passageways connecting the first oil inlet to the first oil outlet may be fluidly isolated from the passageways connecting the second oil inlet to the second oil outlet.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes an electric vehicle powertrain and a method for controlling the powertrain. While principles of the current disclosure are described with reference to an electric vehicle, it should be understood that the disclosure is not limited thereto. Rather, the systems and methods of the present disclosure may be used in any vehicle having a transmission with multiple gearboxes. As used herein, the term "electric vehicle" includes any vehicle or transport machine that is driven at least in part by electricity (e.g., hybrid vehicles, all-electric vehicles, etc.).

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in a stated value.

Figure 1:
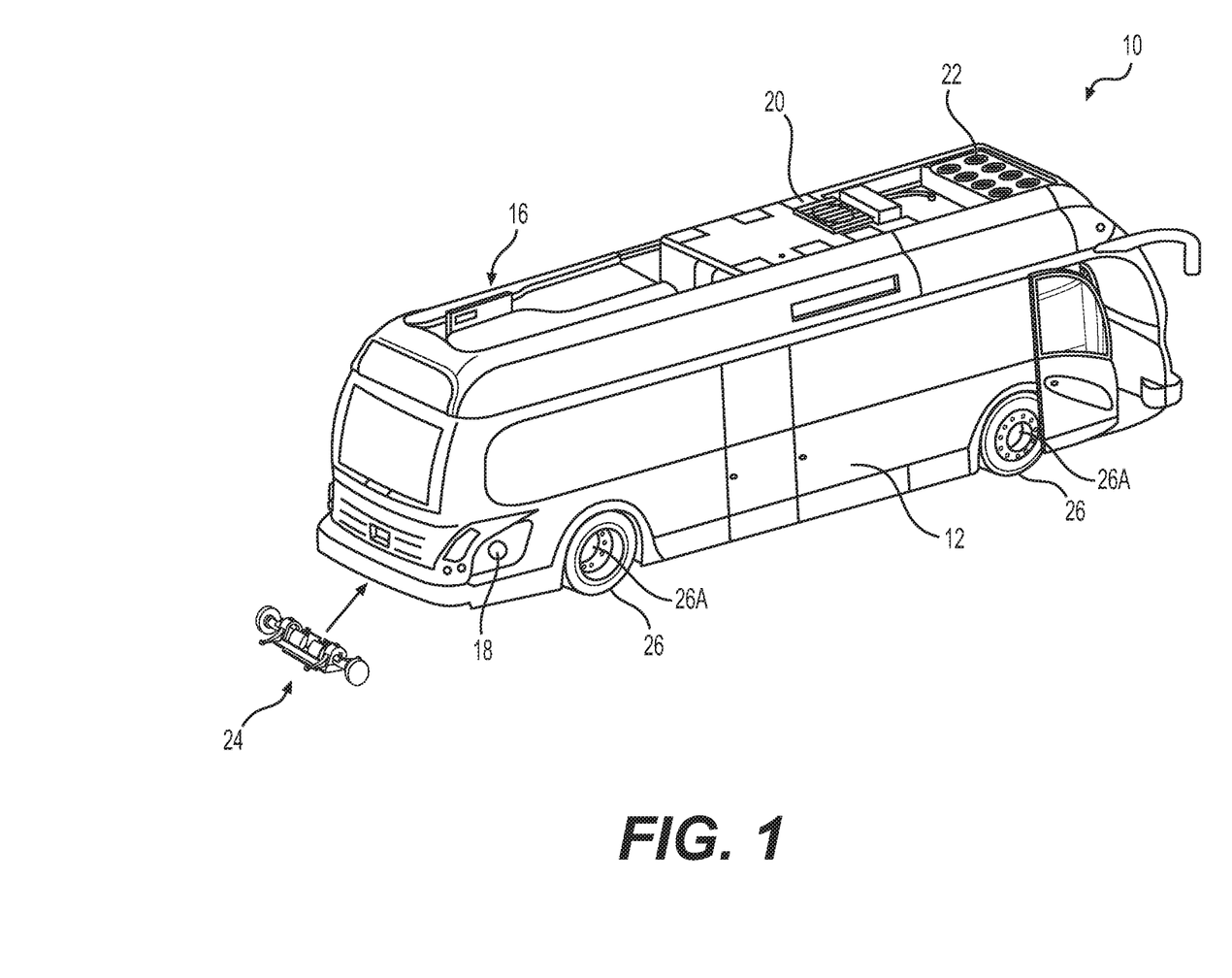
FIG. 1 illustrates an exemplary electric bus and axle assembly according to the present disclosure.

FIG. 1 illustrates an electric vehicle in the form of a bus 10. Electric bus 10 may include a body 12 enclosing a space for passengers. In some embodiments, some (or substantially all) parts of body 12 may be fabricated using one or more composite materials to reduce the weight of bus 10. Without limitation, body 12 of bus 10 may have any size, shape, and configuration. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches from the road surface.

Bus 10 may include a powertrain 24 that propels the bus 10 along a road surface. Powertrain 24 may include one or more electric motors that generate power, and one or more gearboxes or transmissions that transmit the power to a pair of drive wheels 26 (e.g., rear drive wheels 26) of bus 10. The drive wheels 26 may be mounted on hubs 26A positioned at opposite ends of an axle assembly. Bus 10 includes batteries (not shown) to store electrical energy to power the electric motors of powertrain 24. In some embodiments, these batteries may be configured as a plurality of battery packs positioned in cavities located under the floor of bus 10. In some embodiments, some or all of the batteries or battery packs may be positioned elsewhere (e.g., roof) on bus 10. The batteries may have any chemistry and construction, and the battery chemistry and construction may help enable fast charging of the batteries. In some embodiments, the batteries may be lithium titanate oxide (LTO) batteries. In some embodiments, the batteries may be nickel metal cobalt oxide (NMC) batteries. It is also contemplated that, in some embodiments, the batteries may include multiple different chemistries. Some of the possible battery chemistries and arrangements in bus 10 are described in commonly assigned U.S. Pat. No. 8,453,773, which is incorporated herein by reference in its entirety.

A charging interface 16 may be provided on the roof of bus 10 to charge the batteries. Charging interface 16 may include components that interface a charging head of an external charging station to charge the batteries. Some possible embodiments of charging interfaces 16 that may be used for bus 10 are described in commonly-assigned U.S. Patent Application Publication No. 2014/0070767, which is incorporated by reference in its entirety herein. Alternatively or additionally, bus 10 may include other charging interfaces, such as, for example, a charge port (e.g., an electric socket covered by an openable cover 18 on body 12) that is configured to receive a charging plug and charge bus 10 using power from a utility grid. In such embodiments, bus 10 may additionally or alternatively be charged by connecting the plug to the socket. Some possible embodiments of charge port that may be used for bus 10 are described in commonly-assigned U.S. Patent Application Publication No. 2018/0037128 (U.S. patent application Ser. No. 15/589,281, filed May 8, 2017), which is incorporated by reference in its entirety herein.

Bus 10 may also include additional components, such as an HVAC system 20 to cool the passenger compartment, and a radiator 22 to assist in cooling the heat producing components of bus 10. As will be described later with reference to FIGS. 5 and 7, a coolant may circulate between radiator 22 and the heat producing components (such as, for example, motors, batteries, etc.) to dissipate heat produced by these components. Although charging interface 16, the charge port, HVAC system 20, and radiator 22 are illustrated as being positioned at specific locations (e.g., on the roof, rear, etc.) of the bus 10, in general, these components may be positioned anywhere on bus 10.

Figure 2:
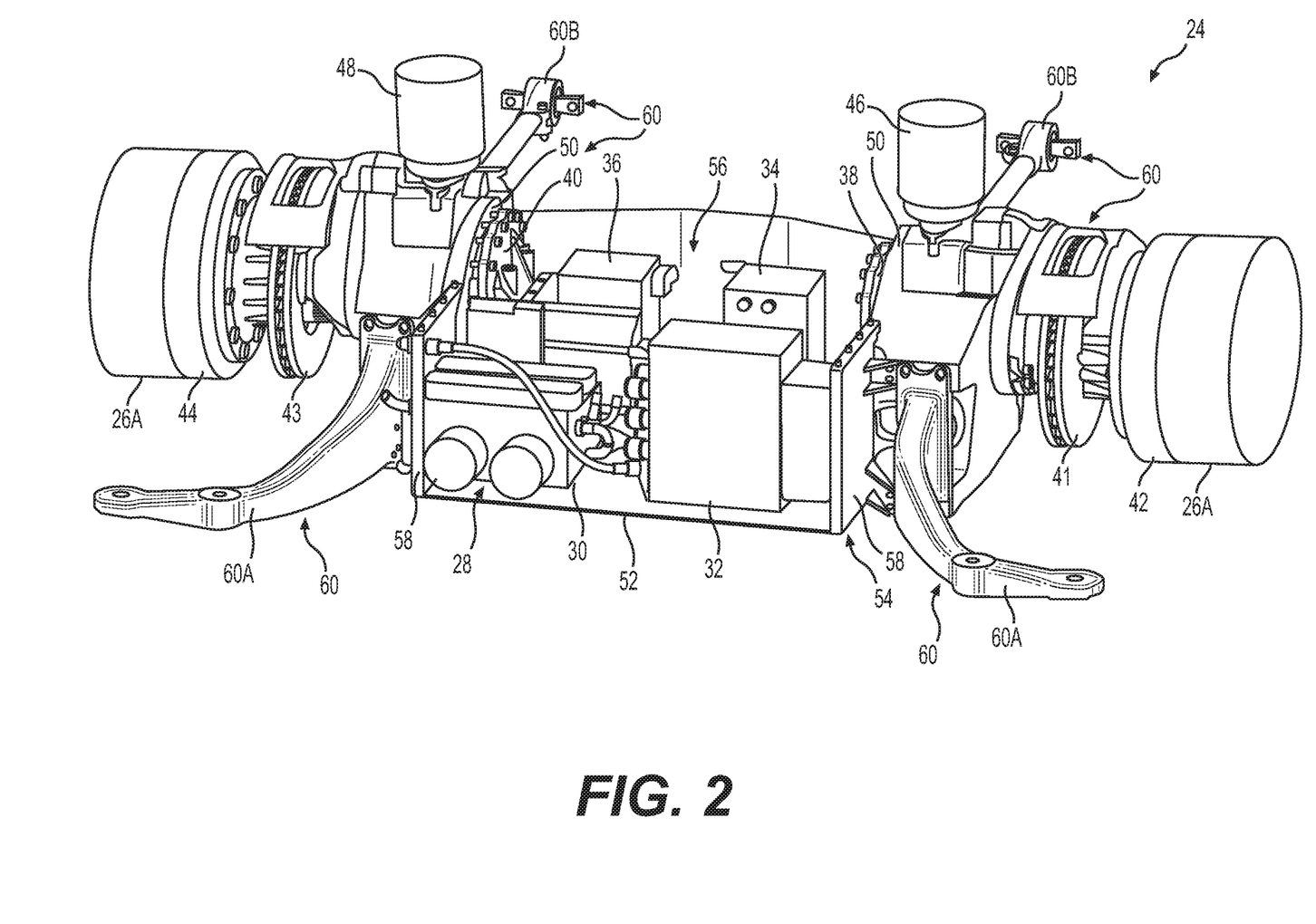
FIG. 2 is a component illustration of the exemplary axle assembly of the bus of FIG. 1.

Referring to FIGS. 1 and 2, powertrain 24 of bus 10 may be configured as an axle assembly that extends between a pair of hubs 26A (upon which drive wheels 26 are mounted). In the discussion below, powertrain may also be referred to as axle assembly. Axle assembly 24 rotates the hubs 26A and propels the drive wheels 26 (e.g., rear wheels 26) along a road surface. As depicted in FIG. 1, axle assembly 24 may be modular, in that it can be constructed and transported as a unit that can be coupled to the rest of the vehicle. Axle assembly 24 may have bi-directional power flow. The term "bi-directional power flow" as used herein means that the axle assembly 24 may either transfer power to drive wheels 26 or apply regenerative braking to slow wheels 26 down. As discussed in detail below, axle assembly 24 may include or otherwise be coupled to an oil manifold 28 (FIG. 2). Oil manifold 28 includes a manifold body 30 and several components that may help to provide two separate flow paths of oil to respective gearboxes, with the oil being cooled and/or cleaned in the two flow paths.

As shown in FIG. 2, axle assembly 24 may include two electric motors 34, 36 coupled to hubs 26A through a pair of multispeed gearboxes 38, 40, a pair of brake rotors 41, 43, and a set of speed reduction units (or SRU) 42, 44. In some embodiments, the two electric motors 34, 36 may be connected to different hubs 26A. For example, with reference to FIG. 2, electric motor 34 may be connected to the right-side hub 26A through gearbox 38, brake rotor 41, and SRU 42, and electric motor 36 may be connected to the left-side hub 26A through gearbox 40, brake rotor 43, and SRU 44. One or more inverters 32 may be connected to the batteries of the bus 10 and to each electric motor 34, 36. The two electric motors 34, 36 may be substantially the same, and the two gearboxes 38, 40 may be substantially the same. The two brake rotors 41, 45 may be substantially the same, and the two speed reduction units 42, 44 may be substantially the same. In some embodiments, axle assembly 24 may include more than two motors. Axle assembly 24 may be physically packaged in a linear arrangement extending between rear hubs 26A (and rear drive wheels 26) of bus 10. As provided herein, the term "linear arrangement" of axle assembly 24 means an assembly that extends from one rear wheel 26 to the other rear wheel 26, and is contained within, or approximately within, a cylindrical area formed by the outer diameters of rear wheels 26 and between rear wheels 26. In the embodiment illustrated in FIG. 1, axle assembly 24 forms the rear axle of bus 10. In some embodiments, axle assembly 24 may form the front axle of bus 10, or may form an axle between the front and the rear axle, such as a middle axle on a three-axle articulated bus.

Referring to FIG. 2, the two electric motors 34, 36 and the two multispeed gearboxes 38, 40 may be contained within a cradle 50 of axle assembly 24. Cradle 50 may be formed as a single cast iron piece, or alternatively formed of multiple pieces and/or of different materials such as cast aluminum. Cradle 50 may have a generally rectangular base 52 with its longitudinal dimension extending in a direction toward hubs 26A. Cradle 50 may also include longitudinal sidewalls 54 and an open upper section 56 extending between two generally closed wells on each longitudinal end of the cradle 50. The wells on each end of cradle 50 may be shaped to receive all or a part of the multispeed gearboxes 38, 40. Although not shown, cradle 50 may have access windows or openings in the wells to provide access to portions of multi-speed gearboxes 38, 40. Additionally, cradle 50 may include and/or be supported by a bulkhead 54, which may include support walls 58.

Cradle 50 may also include inverter 32 coupled thereto adjacent a longitudinal sidewall and at a central longitudinal location. Inverter 32 may be coupled to a voltage source, for example, a high voltage current from the one or more batteries (not shown). A plurality of axle suspension arms 60 may extend out from cradle 50 to assist in securing axle assembly 24 to a frame of bus 10. For example, four suspension arms 60 may extend out from cradle 50 adjacent each corner of cradle base 52. In one aspect, as shown in FIG. 2, axle suspension arms 60 may include first axle suspension arms 60A and second axle suspension arms 60B with different configurations or arrangements in order to assist in securing axle assembly 24 to the frame of bus 10. Standard suspension components (e.g. springs or airbags) may be coupled at the free ends of one or more of suspension arms 60 for decreasing vibrations caused by the road during vehicle operation. Also, braking components 46, 48, such as brake canisters and disk brake assemblies, may be coupled to the cradle 50 and may be positioned between the speed reduction units 42, 44 and the multi-speed gearboxes 38, 40. Axle assembly 24 may be coupled to other components of bus 10, such as: one or more control systems providing signals and receiving inputs from various components of axle assembly 24; a coolant supply; a high voltage current supply from the one or more batteries or other electrical power source; and/or other inputs from any other appropriate component of bus 10.

Electric motors 34, 36 may be permanent magnet AC motors that operate using power from the one or more batteries and/or another electrical power source. In some embodiments, high voltage DC power from the one or more batteries may be converted into 3-phase AC power using inverter 32 and directed to electric motors 34, 36, to drive these motors. High voltage DC power from the one or more batteries may be between 400 and 800 volts DC, between 450 and 750 volts DC, or approximately 600 volts. In general, the torque output of each electric motor 34, 36 is proportional to the magnitude of the current directed to the electric motor 34, 36. Although each electric motor 34, 36 is described as a permanent magnet AC motor, other types of motors may be used in the axle assembly 24.

Inverter 32 may be a dual channel inverter as is known in the art. Each channel of inverter 32 may control one of the electric motors 34, 36 by providing AC current to the motor. Electronic signals controlling inverter 32 may be provided by a control system via a controlled area network (CAN) of the bus 10. It should be noted that, although a single inverter 32 is described as controlling both motors 34, 36, this is only exemplary. In some embodiments, each motor may be controlled by a different inverter.

Although not shown, a control system may be connected to inverter 32, each motor 34, 36, and each multispeed gearbox 38, 40. The control system may also be connected to other components of bus 10. The control system may be one or more dedicated devices (e.g. electronic control modules, ECM's) to control operations of the axle assembly 24, or the control system may be a portion of a device (e.g. a master controller) that controls several operations of bus 10, for example, HVAC control, door opening/closing, etc. As is known in the art, the control system may include a collection of mechanical, electrical, and integrated circuit devices (for example, computational units, A/D converters, memory, switch, valves, actuators, fuses, etc.) that function collectively to send, receive, and analyze data/signals to control the operation of axle assembly 24.

Figure 3A:
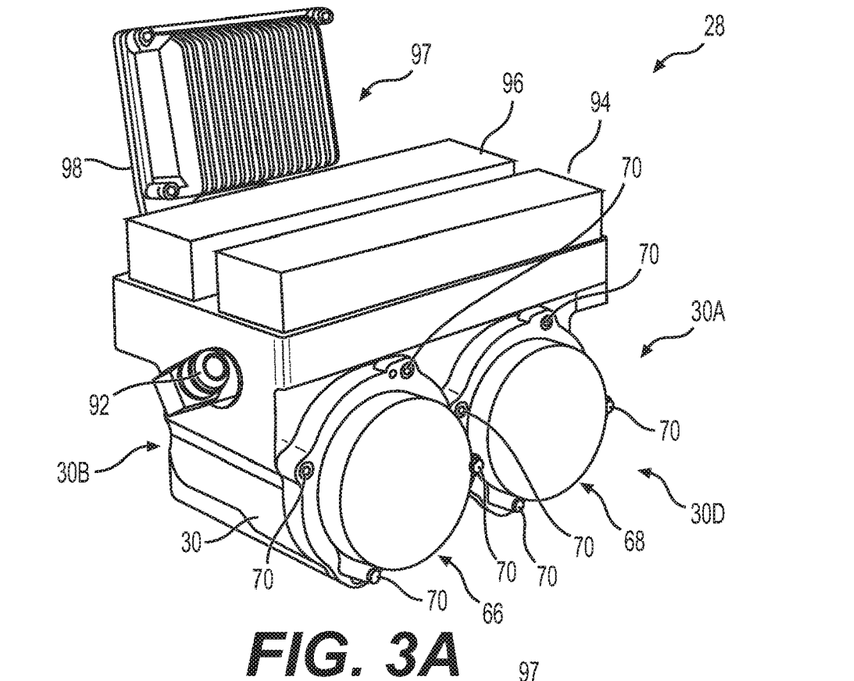
FIGS. 3A and 3B are perspective views of an exemplary oil manifold for the exemplary axle assembly of the bus of FIG. 1.
Figure 3B:
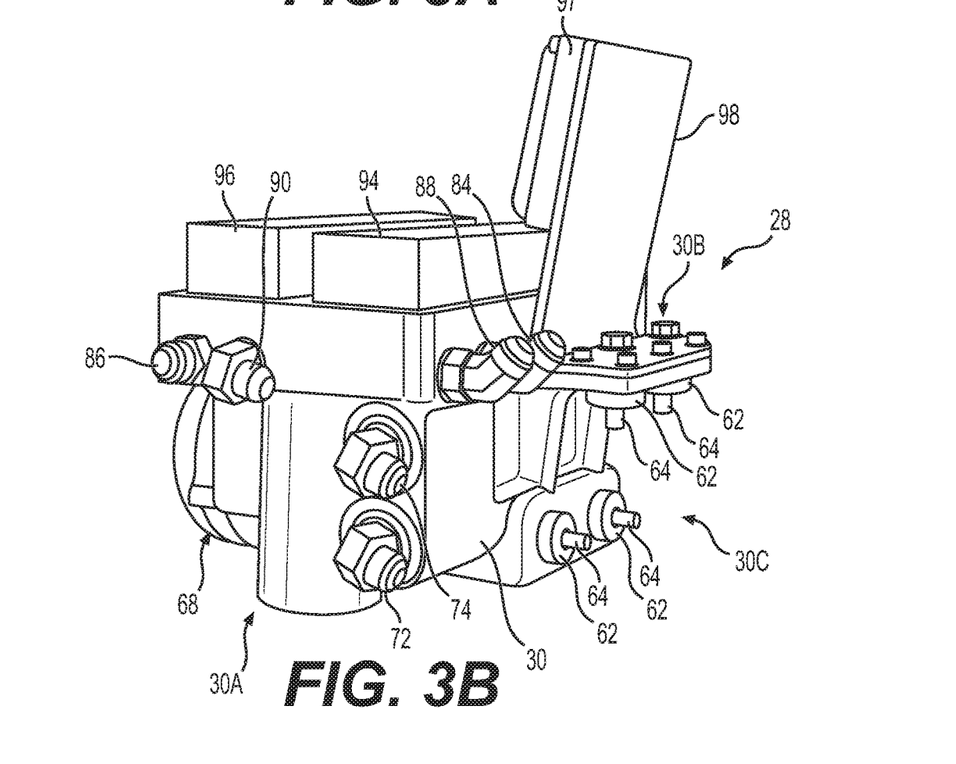
Figure 4:
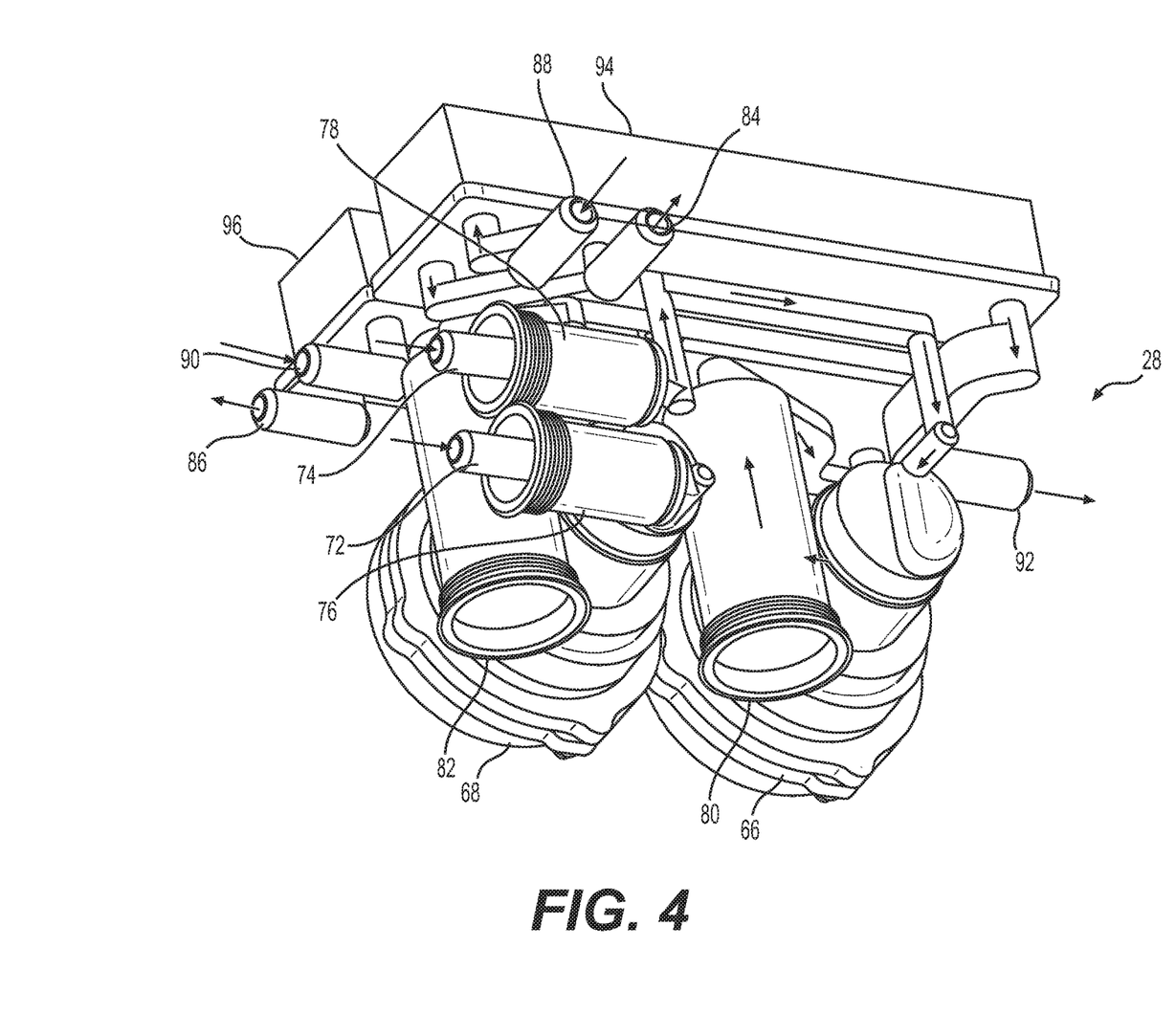
FIG. 4 is an illustration of the flow direction of various fluids through interior portions of the exemplary oil manifold of FIGS. 3A and 3B.

FIGS. 3A and 3B illustrate perspective views of oil manifold 28, and FIG. 4 illustrates a perspective view of an interior portion of oil manifold 28. As discussed in detail below, oil manifold 28 may provide separate paths of clean, cooled oil to gearboxes 38, 40. Oil manifold 28 includes manifold body 30. Manifold body 30 may be substantially rectangular and include a first side 30A, a second side 30B, a rear longitudinal face 30C, and a front longitudinal face 30D. Manifold body 30 may be formed of aluminum, an aluminum alloy or compound, or another appropriate material. A plurality of fluid passageways may be bored or otherwise formed in manifold body 30. Manifold body 30 may be coupled to axle assembly 24, and one or more isolators 62 (FIG. 3B) may help electrically, thermally, or otherwise isolate manifold body 30 from axle assembly 24. For example, isolators 62 may surround one or more connections 64 (e.g., bolts, screws, etc.) that may help couple manifold body 30 to axle assembly 24. Isolators 62 may be formed of neoprene, silicone, or another appropriate material.

Oil manifold 28 includes two oil pumps 66, 68. Oil pumps 66, 68 may pump approximately 1-2 gallons per minute of oil. Oil pumps 66, 68 may be low-voltage electric oil pumps, and may include substantially cylindrical bodies that may be received within corresponding cylindrical openings within manifold body 30. Oil pumps 66, 68 may be operably coupled to and/or controlled by an electronic control unit ("ECU"), as discussed below. Oil pumps 66, 68 may be bolted to manifold body 30 of oil manifold 28 via a plurality of bolts 70.

Oil manifold 28 also includes two oil inlets 72, 74. For example, oil inlet 72 may receive oil from gearbox 38 that drives a drive wheel 26 on one side of axle assembly 24 (e.g., the curb-side drive wheel), and oil inlet 74 may receive oil from gearbox 40 that drives the drive wheel 26 on the opposite side of axle assembly 24 (e.g., the street-side drive wheel). Oil inlets 72, 74 may include threaded openings, seals, or other features in order for oil tubes to be sealingly coupled to oil inlets 72, 74. Oil inlets 72, 74 may be positioned on first side 30A (e.g., the curb side) of manifold body 30.

As shown in FIG. 4, oil manifold 28 may also include two inlet screens 76, 78 positioned interior of respective oil inlets 72, 74. Inlet screens 76, 78 may be removable from oil manifold 28 in order to inspect or replace inlet screens 76, 78. Furthermore, oil manifold 28 may include two oil filters 80, 82 fluidly connected to respective oil inlets 72, 74. Oil filters 80, 82 may be received within cylindrical openings (not shown) in manifold body 30, and oil filters 80, 82 may be removable from oil manifold in order to inspect or replace oil filters 80, 82. Oil filters 80, 82 may be screwed into the cylindrical openings in manifold body 30 and fluidly connect to oil passageways within manifold body 30. Additionally, in one aspect, oil manifold 28 may include bypass channels (not shown) in order to bypass oil filters 80, 82, for example, during operations or conditions where oil filters 80, 82 are blocked.

Oil manifold 28 also includes two oil outlets 84, 86. For example, oil outlet 84 may deliver oil to gearbox 38 that drives, for example, the curb-side wheel 26, and oil outlet 86 may deliver oil to gearbox 40 that drives, for example, the street-side wheel 26. Oil outlets 84, 86 may include threaded openings, seals, or other features in order for oil tubes to be sealingly coupled to oil outlets 84, 86. Oil outlets 84, 86 may be positioned toward first side 30A (e.g., the curb-side) of manifold body 30. In one aspect oil outlet 84 may be positioned on rear longitudinal face 30C, opposite to front longitudinal face 30D of manifold body 30 that receives oil pumps 66, 68. In another aspect, oil outlet 86 may be positioned on first side 30A of manifold body 30.

Oil manifold 28 includes coolant inlets 88, 90. For example, coolant inlet 88 may receive coolant to cool oil delivered to gear box 38 that drives, for example, the curb-side wheel 26, and oil inlet 90 may receive coil to cool oil delivered to gearbox 40 that drives, for example, the street-side wheel 26. Coolant inlets 88, 90 may include threaded openings, seals, or other features in order for oil tubes to be sealingly coupled to coolant inlets 88, 90. Coolant inlets 88, 90 may be positioned toward first side 30A (e.g., the curb side) of manifold body 30. In one aspect, coolant inlet 88 may be positioned adjacent to oil outlet 84, and coolant inlet 90 may be positioned adjacent to oil outlet 86.

Figure 5:
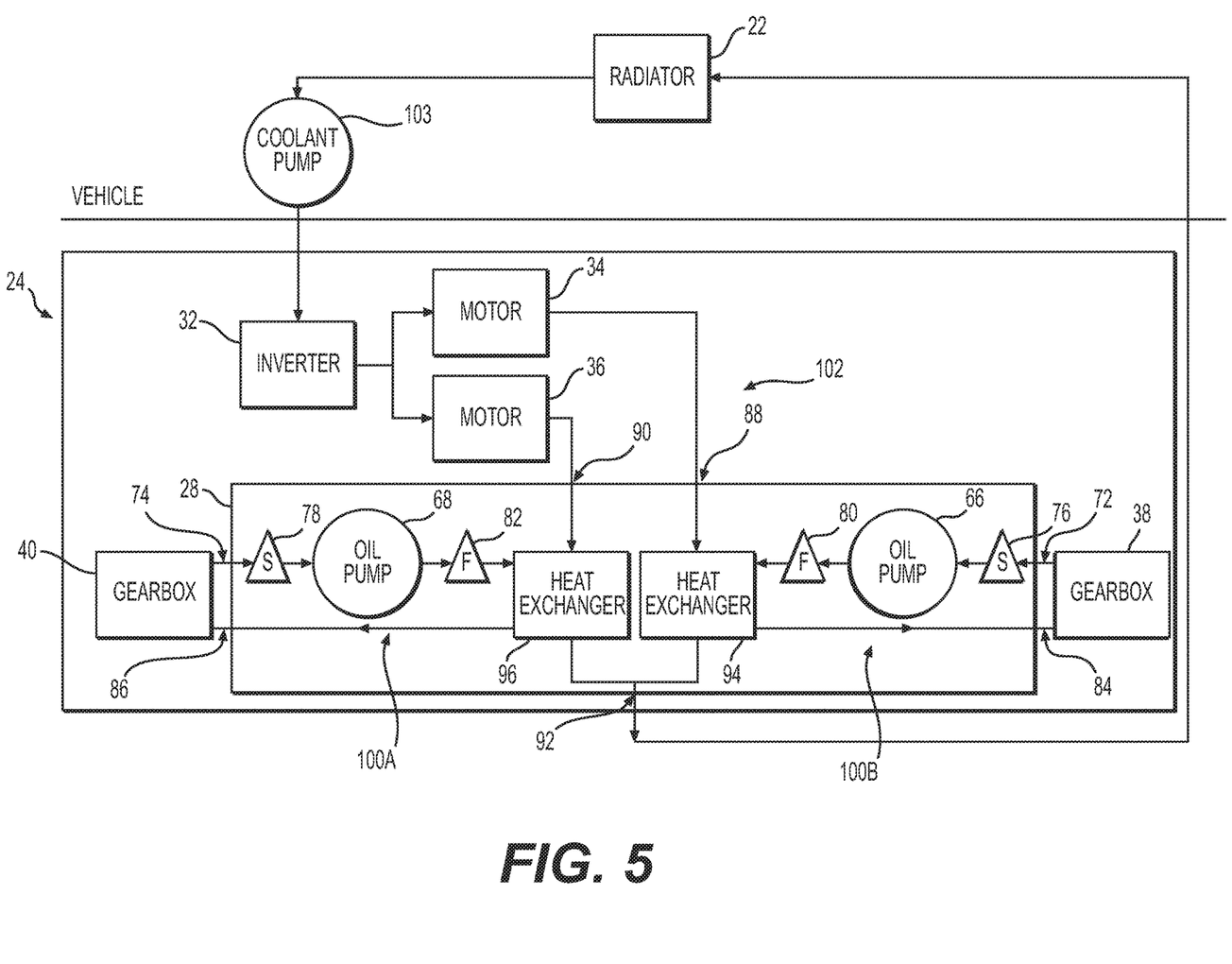
FIG. 5 is a schematic illustration of an exemplary oil flow path for the exemplary oil manifold of FIGS. 3A and 3B.

Oil manifold 28 includes at least one coolant outlet 92. In one aspect, oil manifold 28 may include a single coolant outlet 92 for coolant discharge. For example, the paths for coolant through each of motors 34, 36 may converge within oil manifold 28 before exiting oil manifold through coolant outlet 92. As shown in FIG. 5, the paths for coolant may converge downstream of heat exchangers 94, 96. Alternatively, although not shown, oil manifold 28 may include two coolant outlets, but including a single coolant outlet 92 may save space and/or costs for fittings, tubing, etc.

As shown in FIGS. 3B and 4, oil inlets 72, 74 may be positioned adjacent to each other, for example, spaced apart in a vertical direction on side 30A of oil manifold 28. One oil outlet 84, for example, the oil outlet for the wheel 26 on the street-side of bus 10, may be positioned adjacent to one coolant inlet 88, for example, the coolant inlet for the wheel 26 on the street-side of bus 10. Oil outlet 84 and coolant inlet 88 may be spaced apart in a horizontal direction on side 30C of oil manifold 28. One oil outlet 86, for example, the oil outlet for the wheel 26 on the curb-side of bus 10, may be positioned adjacent to one coolant inlet 90, for example, the coolant inlet for the wheel 26 on the curb-side of bus 10. Oil outlet 86 and coolant inlet 90 may be spaced apart in a horizontal direction on side 30A of oil manifold 28. Coolant outlet 92 may be positioned on side 30B of oil manifold 28. Each of the inlets and outlets may include angled fluid connectors in order for intake and outlet hoses to be coupled in an appropriate and/or easily accessible manner.

As shown in FIGS. 3A, 3B, and 4, oil manifold 28 may include two heat exchangers 94, 96. Heat exchangers 94, 96 may be liquid-to-liquid heat exchangers, and may allow for coolant to thermally interact with oil. Heat exchangers 94, 96 may be secured to oil manifold 28 with a plurality of bolts 70. For example, bolts 70 may secure each of heat exchangers 94, 96 to oil manifold 28, for example, to a top of manifold body 30, along the edges of each heat exchangers 94, 96. Alternatively or additionally, additional bolts 70 may be positioned between the heat exchangers 94, 96. In either aspect, a plurality of seals or gaskets (not shown) may be positioned around one or more bolts 70 that secure heat exchangers 94, 96 to manifold body 30. For example, oil manifold 28 may include push-in-place seals between manifold body 30 and heat exchangers 94, 96 in order to fluidly seal the connections. Heat exchangers 94, 96 may be wired or wirelessly coupled to a control unit on bus 10 in order to monitor and adjust the flow of coolant and, correspondingly, adjust the temperature of the oil.

Additionally, as shown in FIGS. 3A and 3B, oil manifold 28 may include an electronic control unit ("ECU") 97 coupled manifold body 30 via a bracket 98. ECU 97 may be wired or wirelessly coupled to oil pumps 66, 68, a coolant pump (FIG. 5), one or more temperature sensors within oil manifold 28, gearboxes 38, 40, or within any other components of bus. ECU 97 may be wired or wirelessly connected to the one or more controllers or control units on bus 10 in order to monitor and/or control the flow of oil and coolant through oil manifold 28. ECU 97 may also control the power delivered to motors 34, 36 in order to control the speeds of wheels 26, and/or other features of bus 10. Bracket 98 may removably couple ECU 97 to manifold body 30, and may also be coupled to a portion of body 12 or bus 10, which may help secure axle assembly 24 to bus 10.

FIG. 5 illustrates a schematic view of the flow of oil and coolant through oil manifold 28 and the interior components. As mentioned, the openings and passageways through oil manifold body 30 may be bored out the material forming manifold body 30. As shown, oil may flow through an oil circuit 100, and coolant may flow through coolant circuit 102.

Oil circuits 100A and 100B may be contained within axle assembly 24, for example, between gearboxes 38, 40 and oil manifold 28. As shown in FIG. 5, oil may flow from gearboxes 38, 40 into oil manifold 28, for example, through oil inlets 72, 74. The oil may then flow through inlet screens 76, 78, oil pumps 66, 68, and oil filters 80, 82. The oil may then flow through heat exchangers 94, 96, and back to one of gearboxes 38, 40. Oil pumps 66, 68 may control and/or drive the flow of oil through oil circuit 100. Furthermore, it is noted that oil circuit 100 includes two separate oil flow paths, each driven by one of oil pumps 66, 68. Accordingly, oil circuit 100 may provide for individually controlled and/or different flow rates of oil through each of gearboxes 38, 40.

Coolant circuit 102 may be coupled to any coolant source, for example, radiator 22. A coolant pump 103 may help deliver coolant from the coolant source to inverter 32. Coolant pump 103 may be mounted on axle assembly 24, or may be mounted on body 12 of bus 10 and be fluidly connected to inverter 32. Inverter 32 may be fluidly connected to both motors 34, 36, and each of motors 34, 36 may be fluidly coupled to respective heat exchangers 94, 96, as shown. For example, coolant may flow from motors 34, 36 and into oil manifold 28 through coolant inlets 88, 90. After passing through gearbox oil heat exchangers 94, 96, coolant may flow to radiator 22. For example, coolant may flow from heat exchangers 94, 96 and out of oil manifold 28 through coolant outlet 92.

Oil and coolant may thermally interact via heat exchangers 94, 96. For example, hot oil from gearboxes 38, 40 may be pumped by oil pumps 66, 68 to heat exchangers 94, 96.

Within heat exchangers 94, 96, the hot oil may transfer heat to coolant delivered to heat exchangers 94, 96 from coolant circuit 102. The cooled oil may then be pumped to one of gearboxes 38, 40, and the heated coolant may then be cooled in radiator 22.

Figure 6:
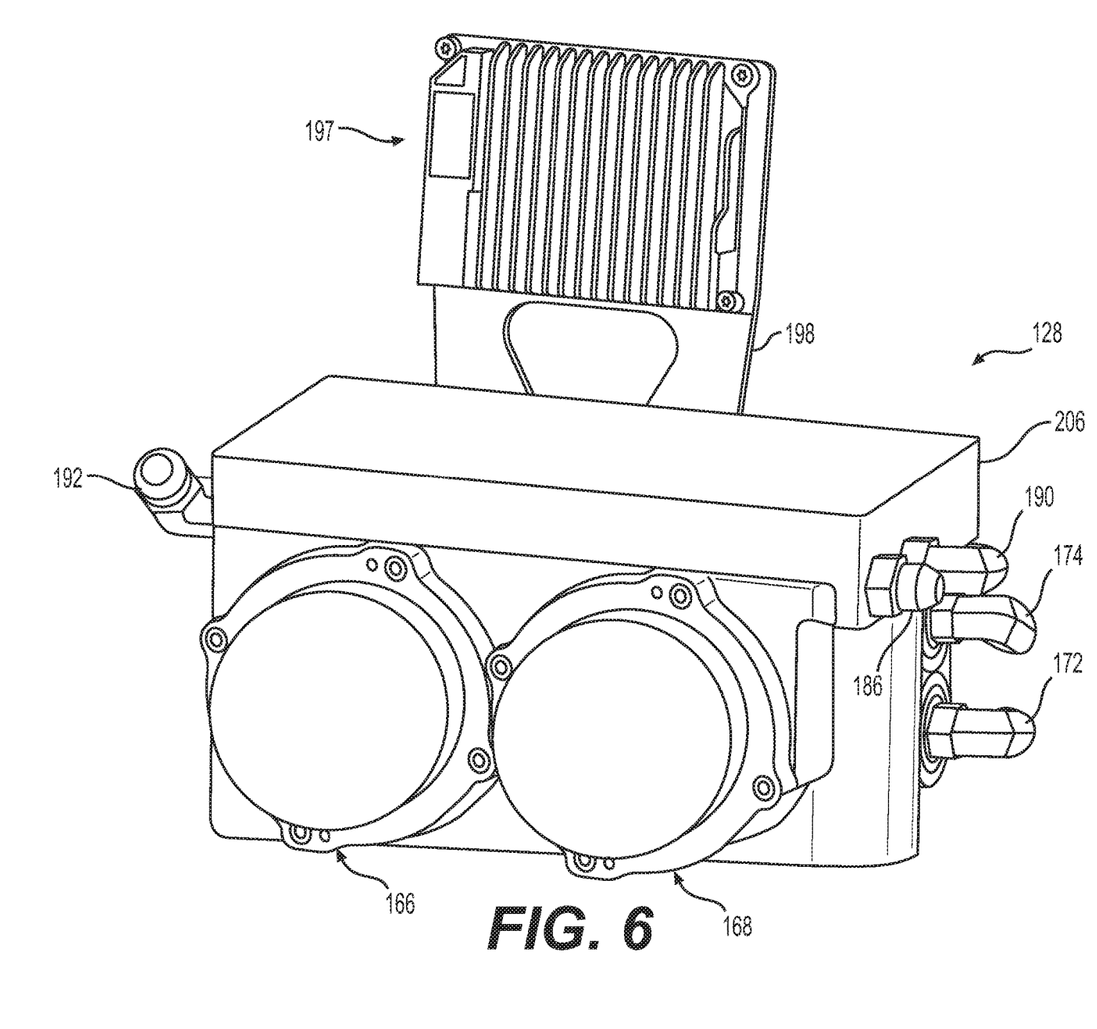
FIG. 6 is a perspective view of another exemplary oil manifold for the exemplary axle assembly of the bus of FIG. 1.
Figure 7:
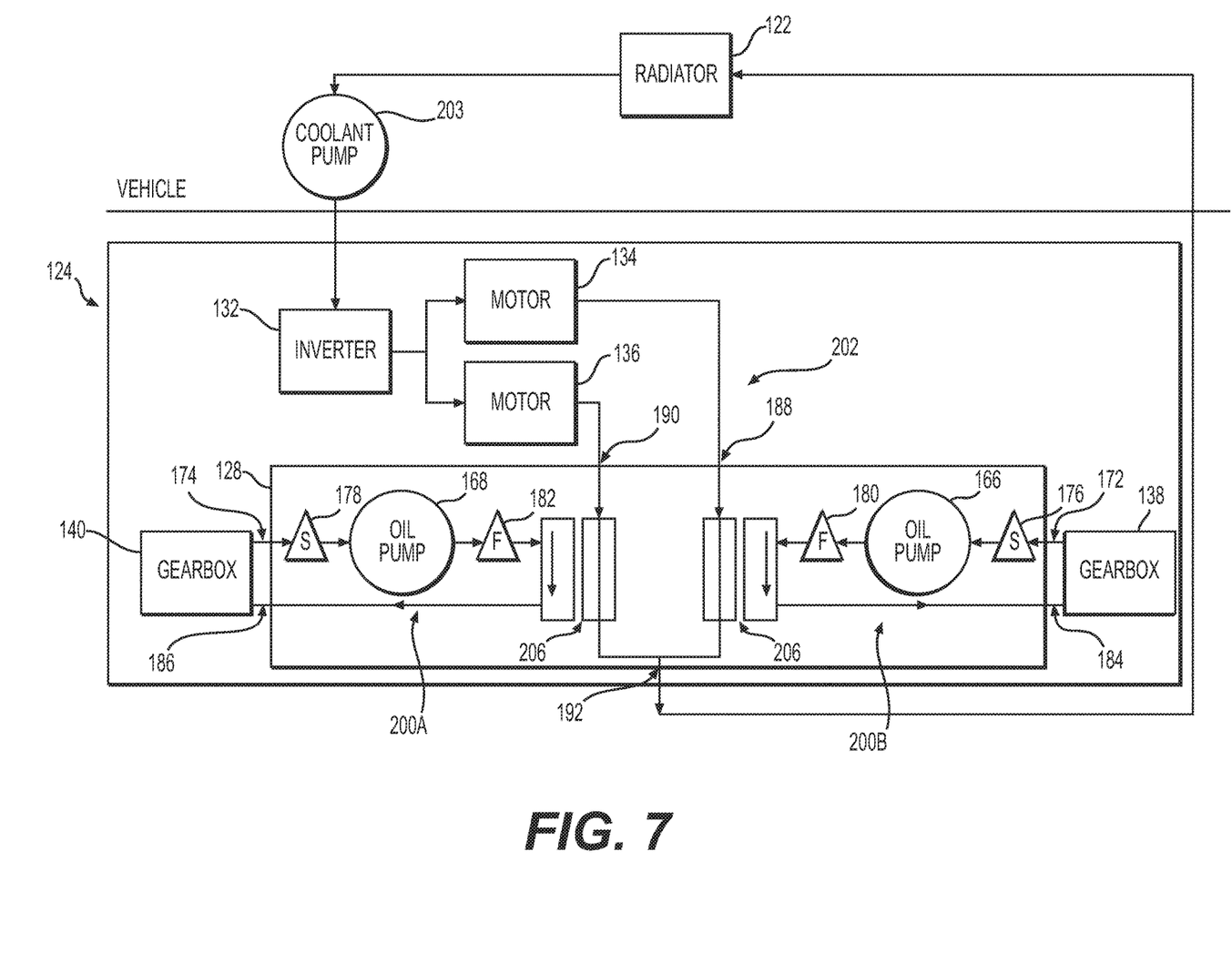
FIG. 7 is a schematic illustration of an exemplary oil flow path for the exemplary oil manifold of FIG. 6.

FIGS. 6 and 7 illustrates an alternative example with similar elements to oil manifold 10 shown by 100 added to the reference numbers. Specifically, FIG. 6 illustrates a perspective view of an oil manifold 128. Oil manifold 128 includes a manifold body 130 similar to manifold body 30. Additionally, oil manifold 128 includes oil pumps 166, 168, oil and coolant inlets and outlets 172, 174, 184, 186, 188, 190, and 192 positioned similar to oil manifold 28, as discussed above with respect to FIGS. 3A, 3B, and 4. Oil manifold 128 does not include heat exchangers. Instead, oil manifold 128 may include bypass plates 206 in order to allow the oil and coolant to flow without heat exchangers. FIG. 7 is a schematic view of the flow of oil and coolant through oil manifold 128. As shown in FIG. 7, oil manifold 128 may allow oil to flow through an oil circuit 200, and may allow coolant to flow through coolant circuit 202.

Oil circuit 200 may contained within axle assembly 124 similar to axle assembly 24, for example, between a pair of gearboxes 138, 140 and oil manifold 128. As shown in FIG. 7, oil may flow from gearboxes 138, 140 into oil manifold 128, for example, through oil inlets 172, 174. The oil may then flow through inlet screens 176, 178, oil pumps 166, 168, and oil filters 180, 182. The oil may then flow through bypass plates 206, and back to one of gearboxes 138, 140. Oil pumps 166, 168 may control and/or drive the flow of oil through oil circuit 200. As discussed above, oil circuit 200 includes two separate oil flow paths, each driven by one of oil pumps 166, 168. Accordingly, oil circuit 200 may provide for different flow rates of oil through each of gearboxes 138, 140.

Coolant circuit 202 may be coupled to any coolant source, for example, a radiator 122. A coolant pump 203 may help deliver coolant from the coolant source to inverter 132. Coolant pump 203 may be mounted on axle assembly 124, or may be mounted on body 12 of bus 10 and be fluidly connected to inverter 132. Inverter 132 may be fluidly connected to both motors 134, 136, and each of motors 134, 136 may be fluidly coupled to respective bypass plates 206, as shown. For example, coolant may flow from motors 134, 136 and into oil manifold 128 through coolant inlets 188, 190. After passing through bypass plates 206, coolant may flow to radiator 122. For example, coolant may flow from bypass plates 206 and out of oil manifold 128 through coolant outlet 192.

Oil and coolant may not thermally interact via bypass plates 206. For example, bypass plates 206 may include separate fluid channels to connect the flow of oil from oil filters 180, 182 to respective gearboxes 138, 140, and to connect the flow of coolant from motors 134, 136 to radiator 122. Hot oil from gearboxes 138, 140 may be pumped by oil pumps 166, 168 into oil flow channels in bypass plates 206. The coolant and oil passing through respective flow channels in bypass plates 206 may be substantially thermally isolated.

Bypass plates 206 may be used on an oil manifold in situations where heat exchangers are less desirable (e.g., too expensive, cold climates, etc.). Moreover, bypass plates 206 may be more cost effective and/or lighter in order to reduce the overall cost and/or weight of oil manifold 128. Bypass plates 206 may be useful in situations or conditions in which the drivetrain is not being loaded to an extent that heat exchangers are necessary.

Oil manifold 128 may be coupled to axle assembly 24 as discussed with respect to oil manifold 28. Additionally, oil manifold 28 may be uncoupled from axle assembly 24, and oil manifold 128 may be coupled to axle assembly in a swap out operation. The swap out operation includes uncoupling the one or more oil and coolant hoses from oil manifold 28, and coupling the hoses to oil manifold 128. Similarly, oil manifold 28 may replace oil manifold 128 in a similar operation.

Oil manifolds 28, 128 may allow for the delivery, filtering, and cooling of oil for two gearboxes. The delivery, filtering, and cooling may occur in two fluidly isolated oil circuits. As a result, oil pumps 66, 68, 166, 168 may control the respective flow rates, in order for oil to be pumped at different rates if necessary. For instance, there is a reduced risk that one gearbox will receive more oil than another gearbox, avoiding a situation where one gearbox is flooded with oil and another gearbox is drained.

Moreover, oil manifolds 28 and 128 may help to package oil pumps 66, 68, 166, 168, oil inlets 72, 74, 172, 174, inlet screens 76, 78, 176, 178, oil filters 80, 82, 180, 182, oil outlets 84, 86, 184, 186, and coolant outlets 92, 192, along with heat exchangers 94, 96 or bypass plates 206, in a small, compact manifold. The components of axle assembly 24 and/or the space under bus 10 may not provide a large amount of room, but oil manifolds 28, 128 may allow for efficient and effective oil filtering and cooling in a small space. Additionally, oil manifolds 28, 128 may help to minimize the overall weight of the oil treatment apparatus. For example, oil manifold 28 with heat exchangers 94, 96 may include a total weight of approximately 60-70 pounds, and oil manifold 128 with bypass plates 206 may include a total weight of approximately 50-60 pounds. Furthermore, coupling the filters, pumps, etc. to oil manifolds 28, 128 may help to reduce the overall number of fittings, valves, hoses, etc., which may help to reduce costs and/or the likelihood of a leak, breakage, or other malfunction.

While principles of the present disclosure are described herein with reference to powertrains for electric buses, it should be understood that the disclosure is not limited thereto. Rather, the systems and methods described herein may be employed in any type of electric vehicle. Also, those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. An electric vehicle, comprising:
   a powertrain including:
      an axle having a first drive wheel and a second drive wheel;
      a first motor and a first gearbox operatively coupled to the first drive wheel; and
      a second motor and a second gearbox operatively coupled to the second drive wheel;
   a radiator including coolant; and
   an oil manifold including first and second oil inlets, first and second oil outlets, first and second coolant inlets, and at least one coolant outlet, wherein the oil manifold is fluidly connected to the first and second gearboxes, the first and second motors, and to the radiator.

2. The vehicle of claim 1, wherein the oil manifold forms a first oil flow circuit to filter and cool oil from the first motor, wherein the oil manifold forms a second oil flow circuit to filter and cool oil from the second motor, and wherein the first oil flow circuit is fluidly isolated from the second oil flow circuit.

3. The vehicle of claim 2, wherein the oil manifold includes two oil pumps, and wherein one oil pump is configured to control the flow of oil between the first oil inlet and the first oil outlet and another oil pump is configured to control the flow of oil between the second oil inlet and the second oil outlet.

4. The vehicle of claim 3, wherein the oil manifold further comprises first and second oil screens positioned upstream of the two oil pumps, and wherein the oil manifold further comprises first and second oil filters positioned downstream of the two oil pumps.

5. The vehicle of claim 3, further comprising an electronic control unit coupled to the oil manifold, wherein the electronic control unit is configured to control the two oil pumps.

6. The vehicle of claim 3, wherein the two oil pumps are configured to control the flow of oil in the first and second oil flow circuits independently.

7. The vehicle of claim 2, further comprising one or more heat exchangers configured to receive coolant from the first and second coolant inlets, wherein oil in the first oil flow circuit and the second oil flow circuit thermally interacts with coolant within the one or more heat exchangers.

8. The vehicle of claim 1, wherein the oil manifold is formed of aluminum or an aluminum alloy, and wherein the manifold includes bored fluid passageways to connect the oil inlets to the oil outlets and the coolant inlets to the at least one coolant outlet.

9. The vehicle of claim 1, further comprising at least one coolant pump, wherein the coolant inlets are configured to receive coolant from the at least one coolant pump, and wherein the at least one coolant outlet is fluidly connected to the radiator.

10. The vehicle of claim 1, wherein the oil manifold is mounted on the axle between the first and second gearboxes, and wherein the oil manifold includes one or more insulators between a body of the oil manifold and the axle.

11. An oil manifold for an electric vehicle, comprising:
first and second oil inlets;
first and second oil outlets;
first and second coolant inlets;
at least one coolant outlet; and
first and second oil pumps,
wherein the first and second oil inlets, first and second oil outlets, and first and second oil pumps form two fluidly isolated oil flow paths within the oil manifold.

12. The oil manifold of claim 11, further comprising first and second oil screens positioned upstream of the two oil pumps, and first and second oil filters positioned downstream of the two oil pumps.

13. The oil manifold of claim 11, wherein the first and second oil pumps are electric pumps.

14. The oil manifold of claim 11, further comprising one or more heat exchangers coupled to the oil flow circuits and the coolant flow circuits.

15. The oil manifold of claim 11, further comprising one or more bypass plates coupled to the oil flow circuits and the coolant flow circuits.

16. A powertrain for an electric vehicle, comprising:
a first electric motor coupled to a first drive wheel via a first gearbox;
a second motor independently coupled to a second drive wheel via a second gearbox; and
an oil manifold, the oil manifold including:
a manifold body;
first and second oil inlets on the manifold body;
first and second oil outlets on the manifold body;
first and second coolant inlets on the manifold body; and
at least one coolant outlet on the manifold body,
wherein the manifold body includes a plurality of passageways fluidly connecting the first oil inlet to the first oil outlet, the second oil inlet to the second oil outlet, and the first and second coolant inlets to the at least one coolant outlet, and
wherein the passageways connecting the first oil inlet to the first oil outlet are fluidly isolated from the passageways connecting the second oil inlet to the second oil outlet.

17. The powertrain of claim 16, further comprising:
first and second electric oil pumps;
first and second oil screens; and
first and second oil filters,
wherein the first and second oil screens are positioned upstream of the two oil pumps, and wherein the first and second oil filters positioned downstream of the two oil pumps.

18. The powertrain of claim 17, wherein the first and second oil filters are threadingly secured within cylindrical openings in the manifold body.

19. The oil manifold of claim 17, further comprising an electronic control unit mounted on the manifold body, wherein the electronic control unit is configured to control the first and second electric oil pumps.

20. The oil manifold of claim 16, wherein the manifold body is formed of aluminum or an aluminum alloy.

* * * * *